US006970992B2

(12) United States Patent
Gurumoorthy et al.

(10) Patent No.: US 6,970,992 B2
(45) Date of Patent: *Nov. 29, 2005

(54) APPARATUS TO MAP VIRTUAL PAGES TO DISPARATE-SIZED, NON-CONTIGUOUS REAL PAGES AND METHODS RELATING THERETO

(75) Inventors: Nagasubramanian Gurumoorthy, Hillsboro, OR (US); Shivaprasad Sadashivaiah, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/457,951

(22) Filed: Jun. 9, 2003

(65) Prior Publication Data

US 2003/0200413 A1 Oct. 23, 2003

Related U.S. Application Data

(63) Continuation-in-part of application No. 09/412,077, filed on Oct. 4, 1999, now Pat. No. 6,857,058.

(51) Int. Cl.$^7$ ................................................ G06F 12/10
(52) U.S. Cl. ..................... 711/209; 711/208; 711/207; 711/206; 711/202; 711/203; 711/205; 711/221; 711/170; 711/171; 711/172; 711/173
(58) Field of Search .............................. 711/202, 203, 711/205, 206, 207, 208, 209, 221, 170, 171, 172, 173, 1, 114

(56) References Cited

U.S. PATENT DOCUMENTS

| | | | | |
|---|---|---|---|---|
| 4,285,040 A | * | 8/1981 | Carlson et al. ............. | 711/206 |
| 5,058,003 A | * | 10/1991 | White ......................... | 711/209 |
| 5,129,088 A | * | 7/1992 | Auslander et al. ............. | 711/1 |
| 5,426,752 A | * | 6/1995 | Takahasi et al. ............. | 711/209 |
| 5,475,827 A | * | 12/1995 | Lee et al. ..................... | 711/207 |
| 5,479,627 A | * | 12/1995 | Khalidi et al. ............... | 711/205 |
| 5,542,065 A | * | 7/1996 | Burkes et al. ............... | 711/114 |
| 5,617,554 A | * | 4/1997 | Alpert et al. ................ | 711/208 |
| 5,712,998 A | * | 1/1998 | Rosen ......................... | 711/200 |
| 5,765,201 A | * | 6/1998 | Manges et al. ............. | 711/201 |
| 5,784,707 A | * | 7/1998 | Khalidi et al. ............... | 711/206 |
| 6,041,016 A | * | 3/2000 | Freker .................... | 365/230.02 |
| 6,069,638 A | * | 5/2000 | Porterfield ................... | 345/568 |
| 6,205,530 B1 | * | 3/2001 | Kang ........................ | 711/202 |
| 6,289,431 B1 | * | 9/2001 | Bigbee et al. ............... | 711/206 |
| 6,356,991 B1 | * | 3/2002 | Bauman et al. ............. | 711/209 |
| 6,374,341 B1 | * | 4/2002 | Nijhawan et al. ........... | 711/200 |
| 6,857,058 B1 | | 2/2005 | Gurumoorthy et al. | |

OTHER PUBLICATIONS

Morar, John F., et al., "Can Cryptography Prevent Computer Viruses?", *IBM Thomas J. Watson Research Center*, 1–9.

* cited by examiner

*Primary Examiner*—B. James Peikari
(74) *Attorney, Agent, or Firm*—Schwegman, Lundberg, Woessner & Kluth, P.A.

(57) ABSTRACT

A data processing system includes at least one system processor, chipset core logic, main memory to store computer software and data including operating system software, and a graphics address remapping table (GART). The chipset logic operates on first-sized real memory pages, while the operating system operates on larger, second-sized virtual memory pages. In an embodiment GART driver software maps each virtual page to Z continuous or non-contiguous real pages by filling up the GART with Z entries per virtual page, where Z is the rounded integer number of first-sized pages per second-sized page. In another embodiment, an address translation function converts a target address, corresponding to an address within a virtual page, issuing from a processor into a second address, corresponding to a base address of a real page in main memory. Also described are an integrated circuit and a computer-readable medium to map memory pages of disparate sizes.

19 Claims, 5 Drawing Sheets

APPARATUS TO MAP VIRTUAL PAGES TO DISPARATE-SIZED, NON-CONTIGUOUS REAL PAGES AND METHODS RELATING THERETO

RELATED APPLICATION

This application is a continuation-in-part of U.S. patent application Ser. No. 09/412,077, filed on Oct. 4, 1999, now U.S. Pat. No. 6,857,058.

TECHNICAL FIELD

The subject matter relates to memory systems within a data processing system and, in particular, to methods and apparatus to map virtual pages to smaller, non-contiguous real pages.

BACKGROUND INFORMATION

The Accelerated Graphics Port (AGP) is a bus specification developed by Intel Corporation that enables high performance two-dimensional and three-dimensional graphics to be displayed quickly on ordinary personal computers. AGP uses the computer's main storage, also known as RAM (random access memory), to store graphics data. Graphics data can be accessed, transferred, manipulated, and processed for display by one or more processors in the data processing system, including special-purpose graphics processors.

Intel Corporation designs, manufactures, and sells chipsets to support advanced graphics functions in data processing systems. A chipset is a group of microchips designed to work and to be sold as a unit in performing one or more related functions.

An AGP chipset, in conjunction with a data processing system, such as a personal computer, achieves high performance at a reduced cost, compared with expensive graphics work stations, by utilizing main memory as if it were an extension of the graphics memory, so that significantly more storage space is available for graphics data, which permits a significant increase in realism and visual quality.

In addition, AGP-based systems allow advanced graphics data to be accessed directly from main memory during on-screen rendering rather than being first accessed from main memory and temporarily stored in the relatively smaller (and more expensive per storage size) local graphics memory, thus improving memory bandwidth and latency (i.e. the speed at which data is accessed from memory and transferred to where it is needed in the system) and lowering the overall system cost for equivalent performance.

System memory is typically organized into pages. Some prior AGP chipsets contain core logic to translate operating system addresses (i.e., virtual addresses) into real memory addresses through a memory-based graphics address remapping table (GART) and its associated GART driver. Each GART entry corresponds to a page in the main memory. Until recently, both the chipset and the operating system supported a common page size, for example 4 kilobytes (KB). Therefore, the GART driver performed a straightforward 1:1 mapping between chipset pages and operating system pages that are organized as virtual pages.

However, chipsets and operating systems being developed for future release will not necessarily support the same size page. If pages are mapped by the GART driver on a 1:1 basis, large amounts of system memory space may be wasted. For example, if each operating system page is 16 KB, and each chipset page is 4 KB, then a 1:1 mapping would waste (16 KB−4 KB=12 KB) of memory for each operating system page that is mapped by the GART driver.

There is a need in the data processing art to provide methods and apparatus to map pages of disparate sizes.

DETAILED DESCRIPTION

In the following detailed description, reference is made to the accompanying drawings that form a part hereof, and in which is shown by way of illustration specific embodiments in which the subject matter may be practiced. It is to be understood that other embodiments may be utilized and structural changes may be made without departing from the scope of the present subject matter.

Figure 1:
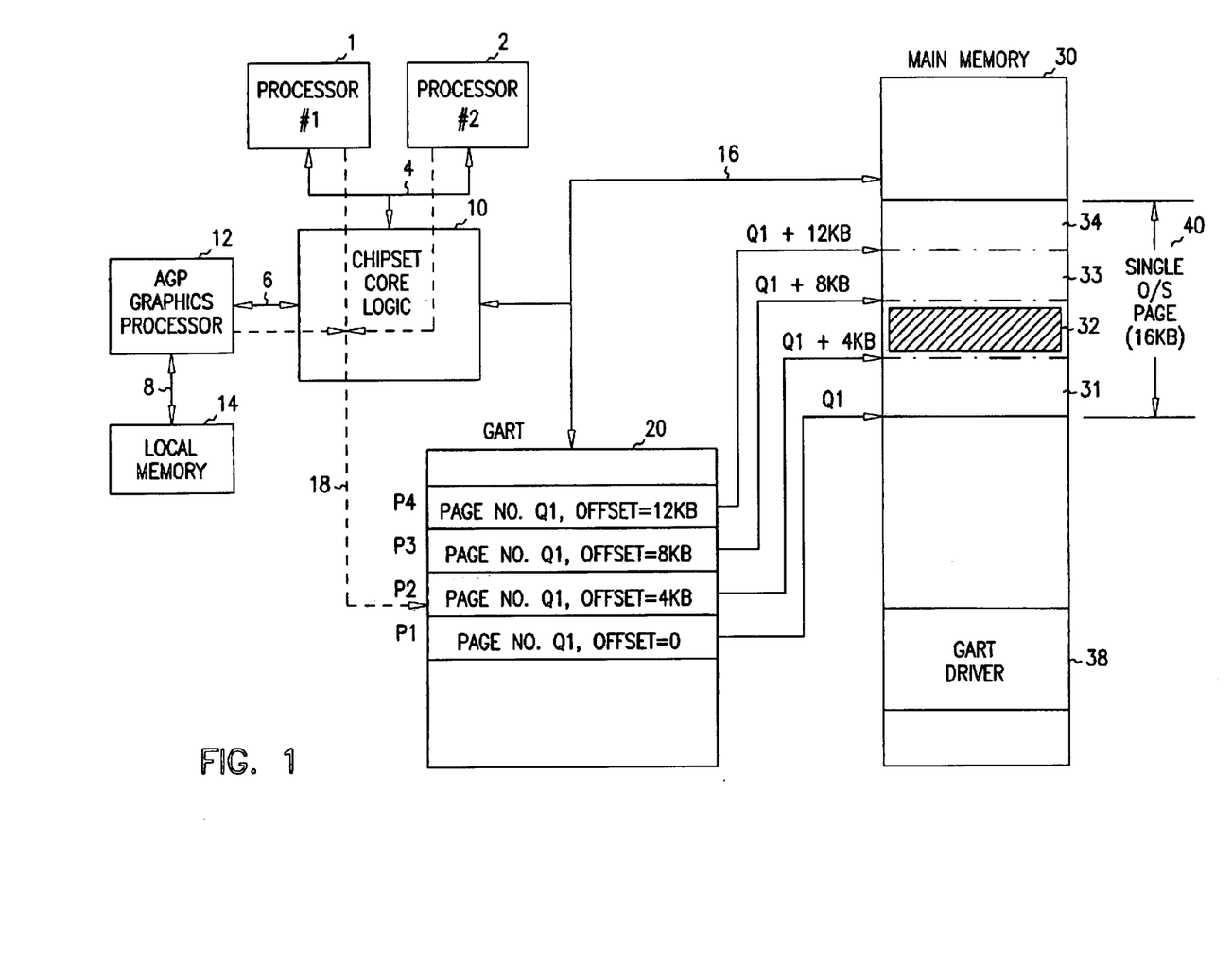
FIG. 1 illustrates a block diagram of a data processing system, including a graphics address remapping table (GART), in accordance with an embodiment of the subject matter.

FIG. 1 illustrates a block diagram of a data processing system, including a graphics address remapping table 20 (GART), in accordance with an embodiment of the subject matter. The data processing system shown in FIG. 1 is capable of performing high performance two-dimensional and three-dimensional graphics processing. In an embodiment, the system comprises system processors 1 and 2, chipset core logic 10, AGP graphics processor 12, local memory 14, GART 20, and main memory 30.

Processors 1 and 2 are coupled to each other and to chipset core logic 10 via bus 4. AGP processor is coupled to chipset core logic 10 via bus 6, and it is coupled to local memory 14 via bus 8. Chipset core logic 10 is coupled to GART 20 and to main memory 30 via bus 16.

Other user interface elements, such as a visual display, keyboard, pointing device, audio speakers, microphone, joy stick, printer, MIDI (musical instrument digital interface) keyboard, and the like can form a part of the data processing system but have not been illustrated in FIG. 1 for the sake of clarity. Likewise, additional peripheral devices, such as magnetic and optical disk drives, CD (compact disc) drives, DVD (digital versatile disc) audio and video drives, other audio and video equipment, modems, network and other I/O (input/output) interfaces, and the like can also form a part of the data processing system, but they too have been omitted from FIG. 1, because one of ordinary skill will understand how to utilize them in the broad spectrum of applications for which the data processing system can be employed.

It will be apparent to one of ordinary skill in the art that while busses such as 4, 6, 8, and 16 are shown as single lines in FIG. 1, they ordinarily will be implemented as multiple conductors. Alternatively they can be implemented in any other suitable transmission medium, such as wireless or fiber optic technology.

It will be apparent that while GART 20 is shown in a block separate from main memory 30, it is actually stored in main memory 30. However, GART 20 can also be implemented in a separate, dedicated memory.

It will be apparent to one of ordinary skill in the art that the data processing system could include more or fewer processors than shown in FIG. 1. It will also be understood that the data processing system could function, although at a reduced level of performance, with only one system processor and/or without AGP graphics processor 12 and local memory 14.

In an embodiment system processors 1 and 2 are Intel® Pentium® III processors commercially available from Intel Corporation. The AGP graphics processor 12 is an Intel® 740 graphics accelerator commercially available from Intel Corporation. Local graphics memory 14 is part of a graphics accelerator card commercially available from Intel Corporation.

Main memory can be implemented in any suitable commercially available memory system. In an embodiment main memory is implemented with synchronous dynamic random access memory (SDRAM) devices as, for example, in an Intel® 440BX motherboard commercially available from Intel Corporation.

In an embodiment the computer software for filling and maintaining the GART is implemented as a GART driver 38 (FIG. 1) which is integrated into the Windows 64® operating system which is anticipated to be commercially available from Microsoft Corporation.

It will be apparent to one of ordinary skill in the art that the software for filling and maintaining the GART can be implemented by a different type of software module which can reside other than in the operating system and be executed by an execution unit (not shown) other than system processors 1,2.

In an embodiment address translation logic is implemented by a suitable circuit component provided in the chipset core logic 10. Chipset core logic 10 comprises one or more logic devices and may take the form of an Intel® 82460GX chipset which is expected to be commercially available from Intel Corporation.

The 82460GX chipset is expected to include several integrated circuits. One chip is an Intel® 82460GX System Address and Control (SAC) integrated circuit which provides addressing functions. Other associated chips are a System Data Path (SDP) integrated circuit that provides data access functions, and a Graphics Expansion Bridge (GXB) integrated circuit providing AGP functions. Another chip is an Intel® I/O and Firmware Bridge (IFB) integrated circuit. This integrated circuit provides a PCI (Peripheral Component Interconnect)-to-ISA (Industry Standard Architecture) bridge function, a PCI-to-IDE (Integrated Device Electronics) function, a USB (Universal Serial Bus system bus) host/hub function, and an enhanced power management function.

In another embodiment, the address translation logic can be implemented in a suitable software module that is executed by one or both processors 1 and 2 or a dedicated execution unit (not shown).

The operation of the software for filling the GART 20 will now be described.

Figure 2:
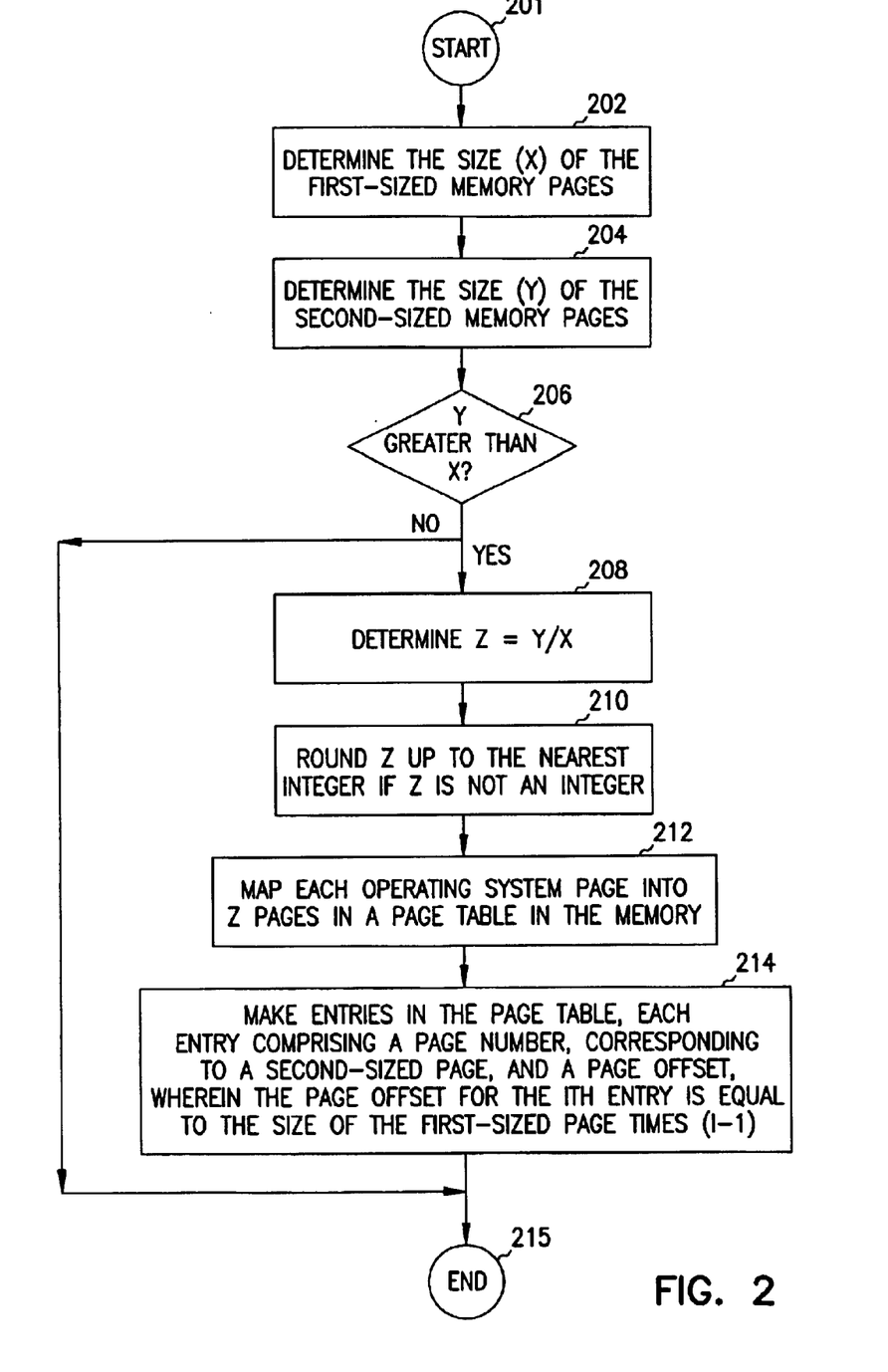
FIG. 2 illustrates a flow diagram of a method for making entries in a graphics address remapping table (GART), in accordance with an embodiment of the subject matter.

FIG. 2 illustrates a flow diagram of a method for making entries in a graphics address remapping table (GART 20, FIG. 1), in accordance with an embodiment of the subject matter.

In box 202 the size (X) of first-sized memory pages, e.g. those supported by the chipset core logic 10, is determined. This can be implemented by a suitable instruction in the GART driver, such as "Get Chipset Page Size".

In box 204 the size (Y) of second-sized memory pages, e.g. those supported by the operating system, is determined. This can be implemented by a suitable instruction in the GART driver, such as "Get Operating System Page Size". Both X and Y are assumed to be positive integers.

In decision box 206, X and Y are compared, and if Y is less than or equal to X, the method ends; otherwise, it proceeds to box 208, where the value (Z) of Y/X is determined.

In box 210, the value of Z is rounded up to the next higher integer if Z is not an integer. Thus Z=5.25 is rounded to 6; Z=6.99 is rounded to 7; and so forth.

In box 212, each operating system page is mapped into Z pages in a page table in memory, e.g. GART 20 in FIG. 1. This operation is further implemented in box 214, wherein entries are made in the page table.

Each page table entry comprises a page number (e.g. Page No. Q1 in FIG. 1) identifying the starting address of a second-sized page (e.g. page 40 in FIG. 1). Each page table entry further comprises a page offset, wherein the page offset for the $I^{th}$ entry is equal to the size of the first-sized page (e.g. the 4 KB pages supported by chipset core logic 10 in the example shown in FIG. 1) times the quantity (I−1). I is assumed to be a positive integer which is less than or equal to Z, i.e. the quotient of the size of the second-sized page divided by the size of the first-sized page.

The method ends in box 215.

An address translation operation involving the GART 20 (FIG. 1) will now be described.

Figure 3:
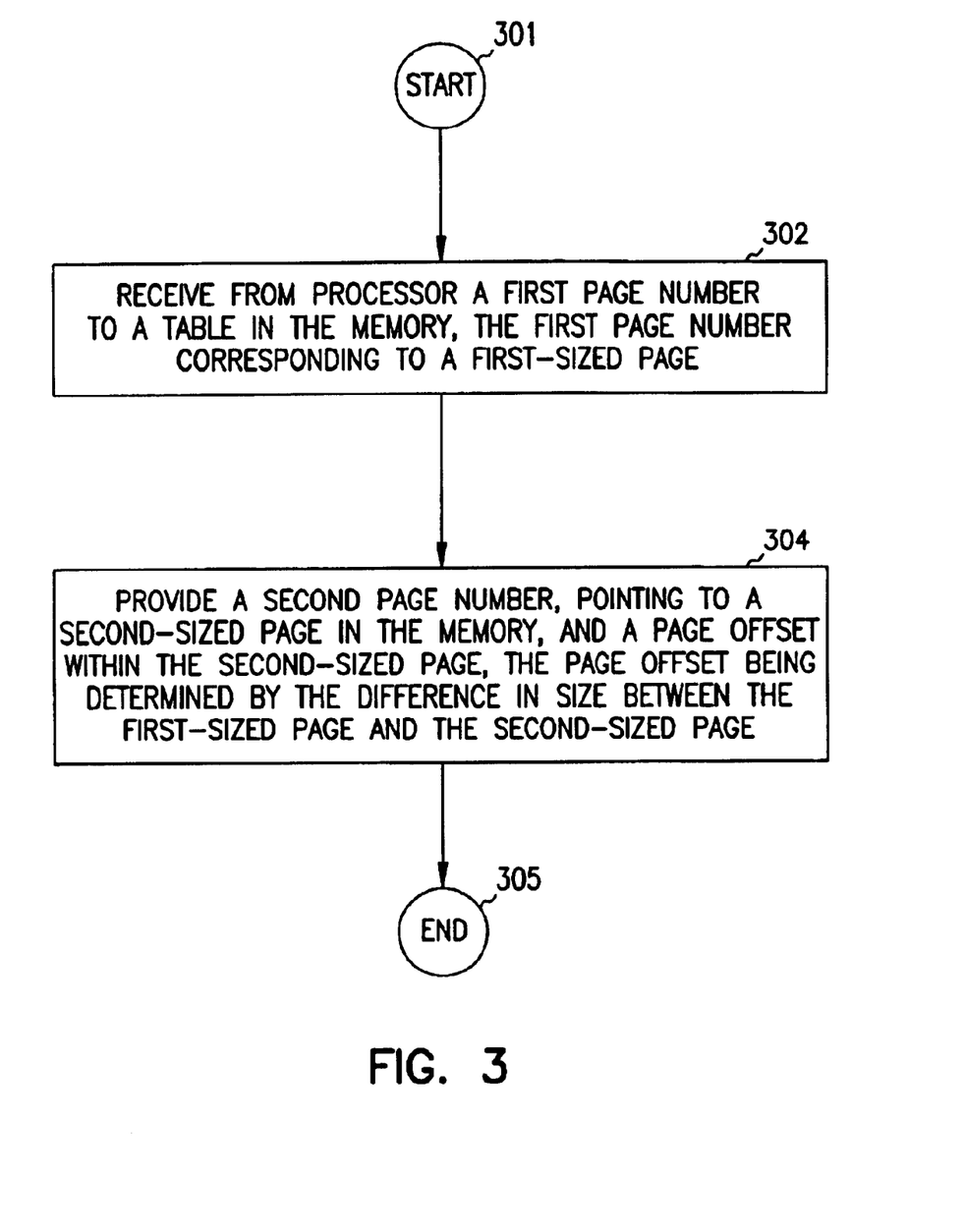
FIG. 3 illustrates a flow diagram of a method for performing an address translation using a graphics address remapping table (GART), in accordance with an embodiment of the subject matter.

FIG. 3 illustrates a flow diagram of a method for performing an address translation using a graphics address remapping table (GART 20, FIG. 1), in accordance with an embodiment of the subject matter.

In box 302 a first page number (e.g. P1, P2, P3, or P4 in FIG. 1) is received from a processor to a table in the memory (GART 20, FIG. 1). The first page number corresponds to a first-sized page (e.g. the 4 KB pages 31–34 supported by chipset core logic 10 in the example shown in FIG. 1).

In box 304 a second page number (e.g. Page No. Q1 in GART 20, FIG. 1) is provided by the address translator. The second page number points to the starting address of a second-sized page (e.g. a 16 KB operating system page 40 in main memory 30, FIG. 1). Also provided by the address translator is a page offset (e.g. 0, 4 KB, 8 KB, or 12 KB in GART 20, FIG. 1) within the second-sized page. The page offset is determined by the difference in size between the first-sized page and the second-sized page, as explained above with reference to FIG. 2.

A specific example of address translation involving disparate sized pages will now be discussed with reference to FIG. 1. Assume that one of processors 1, 2, or 12 desires to access a 4 KB-sized page identified by page number P2. 4 KB is the size of page that is supported by chipset core logic 10. Dashed line 18 in FIG. 1 represents this access request, which passes through chipset core logic 10. It will be understood by one of ordinary skill in the art that the actual physical connection between processors 1, 2, and 12 and GART 20 is over appropriate busses shown in FIG. 1.

In GART 20 the entry corresponding to P2 provides a second page number (Page No. Q1), pointing to the starting address Q1 of the 16 KB-sized operating system page 40 in main memory 30. The GART entry corresponding to P2 also provides a page offset=4 KB within the operating system page 40. This page offset represents the starting address of the 4 KB-sized portion 32 of operating system page 40.

In like manner, the P1, P3, and P4 entries in GART 20 also provide Page No. Q1 as the starting address of page 40. In addition the P1 entry also provides a page offset=0, representing the starting address of the 4 KB-sized portion 31 of operating system page 40. Likewise, the P3 and P4 entries provide page offsets of 8 KB and 12 KB, respectively, representing the starting addresses of the 4 KB-sized portions 33 and 34, respectively.

In an embodiment, the second-sized page is $2^N$ times larger than the first-sized page, N being a positive integer, and GART 20 has $2^N$ entries for each of the second-sized pages. A first entry in the $2^N$ table entries for a specific one of the second-sized pages has an offset equal to zero, and a second entry in the $2^N$ table entries for the specific one of the second-sized pages has an offset equal to the size of the first page.

The $I^{th}$ entry in the $2^N$ table entries for the specific one of the second-sized pages has an offset equal to the size of the first page times the quantity (I−1), where I is a positive integer less than or equal to the quotient (Z) of the size of the second-sized page (Y) divided by the size of the first-sized page (X). In other words, the page offset can range from zero to the size of the first-sized page times the quantity (Z−1).

It will be apparent to one of ordinary skill in the art that other relationships between the sizes of the pages supported by various components in the data processing system can exist and be accommodated by the apparatus and methods disclosed herein.

Still with reference to FIG. 1, it will be seen that the contents of GART 20 and main memory 30 represent data structures stored in a computer-readable medium. Other types of computer-readable media (not shown), such as a magnetic or optical disc, CD ROM (read only memory), DVD, magnetic tape, flash memory card, and the like could also be used to store the data structures. The data structures comprise a first block of data (e.g. GART 20) stored in a first region of memory addresses (e.g. those for GART entries) in the medium, the first block comprising a plurality of entries each of which is addressable by an address (e.g. P1–P4) to a first-sized memory page (e.g. one of pages 31–34), each entry comprising a page address (e.g. Q1) to a second-sized memory page (e.g. page 40) and a page offset. The data structures also comprise a second block of data stored in a second region of memory addresses in the medium (e.g. in main memory), the second block comprising a plurality of second-sized memory pages.

A commercial embodiment of the methods described herein, for example in the form of the Windows® 64 operating system including a GART driver, is expected to be distributed on a computer-readable storage medium having instructions which can be performed by a data processing system.

Mapping to Contiguous and Non-Contiguous Pages

Figure 4:
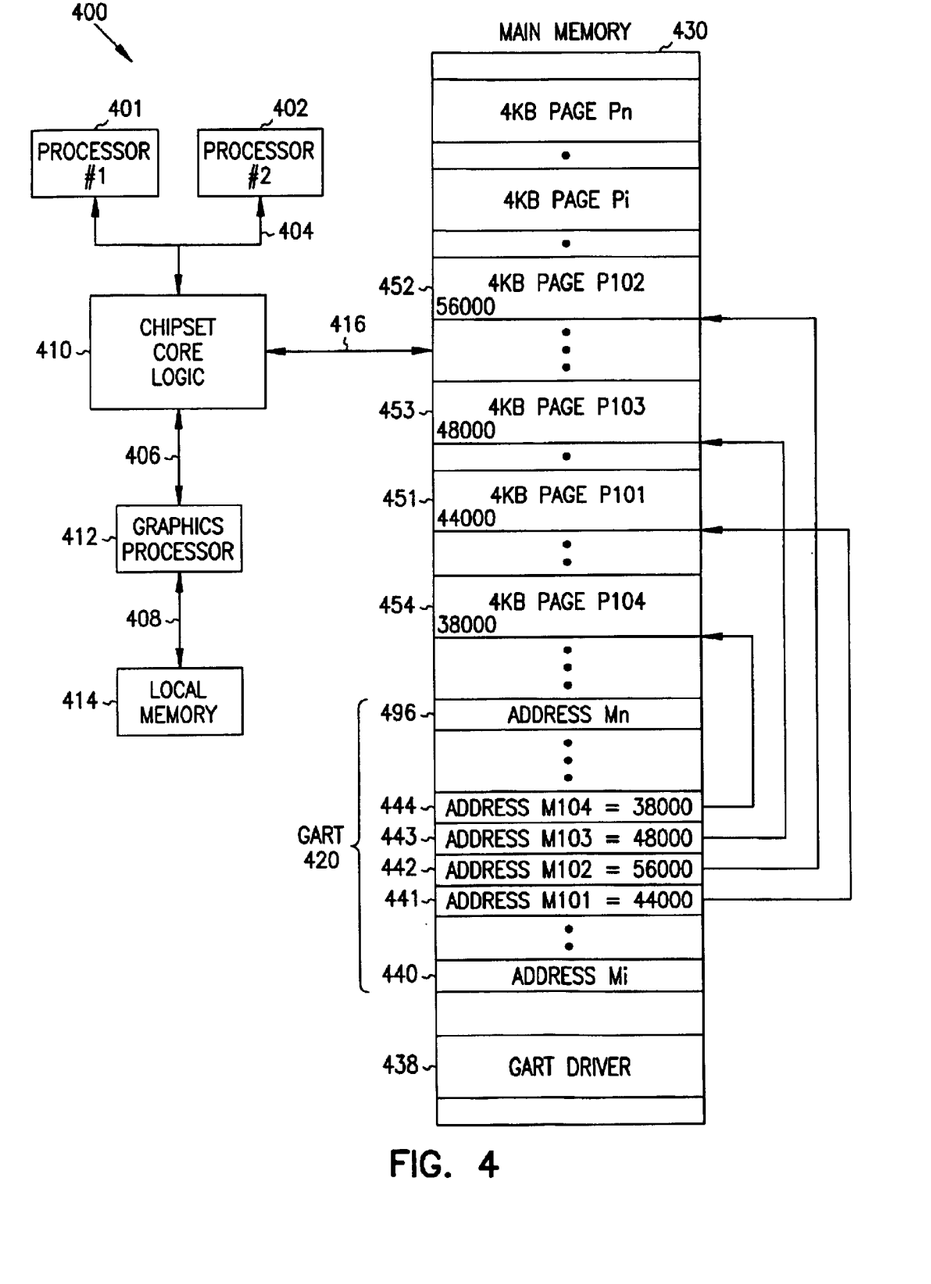
FIG. 4 illustrates a block diagram of a data processing system, including a graphics address remapping table (GART) that supports mapping to both contiguous and non-contiguous real pages, in accordance with an embodiment of the subject matter.

FIG. 4 illustrates a block diagram of a data processing system 400, including a graphics address remapping table 420 (GART) that supports mapping to both contiguous and non-contiguous real pages, in accordance with an embodiment of the subject matter. The data processing system shown in FIG. 4 is capable of performing high performance two-dimensional and three-dimensional graphics processing. In an embodiment, the system comprises system processors 401 and 402, chipset core logic 410, AGP graphics processor 412, local memory 414, and main memory 430.

Processors 401 and 402 are coupled to each other and to chipset core logic 410 via bus 404. AGP graphics processor 412 is coupled to chipset core logic 410 via bus 406, and it is coupled to local memory 414 via bus 408. Chipset core logic 410 is coupled to main memory 430 via bus 416.

Other user interface elements, such as a visual display, keyboard, pointing device, audio speakers, microphone, joy stick, printer, MIDI (musical instrument digital interface) keyboard, and the like can form a part of the data processing system 400 but have not been illustrated in FIG. 4 for the sake of clarity. Likewise, additional peripheral devices, such as magnetic and optical disk drives, CD (compact disc) drives, DVD (digital versatile disc) audio and video drives, other audio and video equipment, modems, network and other I/O (input/output) interfaces, and the like can also form a part of the data processing system 400, but they too have been omitted from FIG. 4, because one of ordinary skill will understand how to utilize them in the broad spectrum of applications for which the data processing system 400 can be employed.

It will be apparent to one of ordinary skill in the art that while busses such as 404, 406, 408, and 416 are shown as single lines in FIG. 4, they ordinarily will be implemented as multiple conductors. Alternatively they can be implemented in any other suitable transmission medium, such as wireless or fiber optic technology.

It will be apparent that while GART 420 is shown as contained within main memory 430, it may also be implemented in another memory, e.g. a dedicated memory.

It will be apparent to one of ordinary skill in the art that the data processing system 400 could include more or fewer processors than shown in FIG. 4. It will also be understood that the data processing system 400 could function, although at a reduced level of performance, with only one system processor and/or without AGP graphics processor 412 and local memory 414.

In an embodiment, the system processors 401 and 402, chipset core logic 410, AGP graphics processor 412, local graphics memory 414, and main memory 430 may be similar to or identical to corresponding elements shown in FIG. 1. In other embodiments, these components may be different from the elements shown in FIG. 1.

In an embodiment, the computer software for filling and maintaining the GART 420 is implemented as a GART driver 438, which may be integrated into an operating system, or alternatively it may be implemented as middleware.

It will be apparent to one of ordinary skill in the art that the software for filling and maintaining the GART 420 may be implemented by a different type of software module that can reside other than in the operating system and be executed by an execution unit (not shown) other than system processors 401, 402.

In an embodiment, address translation logic may be implemented by a suitable circuit component provided in the chipset core logic 410. In another embodiment, the address translation logic can be implemented in a suitable software module that is executed by one or both processors 401 and 402 or a dedicated execution unit (not shown).

A specific example of address translation involving disparate-sized pages will now be discussed with reference to FIG. 4. Assume that one of processors 401, 402, or 412 desires to access a memory location within a 16 KB-sized virtual page (e.g. an operating system page). Assume also that 4 KB is the size of real pages in main memory 430 that are supported by chipset core logic 410. In this example, main memory 430 is illustrated as comprising a plurality of 4 KB real pages, including pages Pi, P101–P104 (identified by reference numbers 451–454, respectively), and Pn.

As shown in FIG. 4, real pages 451–454 may be non-contiguous. As mapped, some or all of real pages 451–454 may be contiguous or non-contiguous within main memory 430.

A memory access operation may occur when an application that is being executed by one of processors 401, 402, or 412 executes a read or write instruction, for example, that comprises a memory address. While certain privileged applications may be capable of directly accessing an address in real memory, let us assume that the currently executing application is accessing a target address in virtual memory, such as an operating system page.

A memory access operation to a target address within virtual memory causes an appropriate functional element, such as a memory controller, within chipset core logic 410 to access GART 420. The information contained within GART 420 enables the proper 4 KB real page in main memory 430 containing the target address to be located and accessed. Let us assume, in this example, that a memory controller within chipset core logic 410 determines that the target address is in a virtual page that we will identify for discussion purposes as Q2.

The GART 420 entries provide a mapping of a single 16 KB virtual page Q2 to four 4 KB real pages 451–454, respectively, in main memory 430. As mentioned above, real pages 451–454 need not be contiguous, i.e. they need not be adjacent or arranged in sequence. In general, GART 420 is illustrated as comprising a plurality of entries, namely Mn entries. Let Mi represent the ith entry in GART 420. Each entry in GART 420 comprises an address that may represent, for example, a base address of a corresponding 4 KB real page in main memory 430.

Thus the Mi entry (identified by reference number 440) of GART 420 may include ADDRESS Mi. The M101 entry (identified by reference number 441) may contain ADDRESS M101, and so forth. The Mn entry (identified by reference number 496) may contain ADDRESS Mn.

Assuming that each virtual page comprises four real pages, as in the current example, each virtual page may be mapped to its corresponding four real pages via four entries in GART 420. For example, for a given virtual page Q2, the first GART entry 441 contains "ADDRESS M101". The second GART entry 442 contains "ADDRESS M102". The third GART entry 443 contains "ADDRESS M103". And the fourth GART entry 444 contains "ADDRESS M104".

If the memory access operation is to a virtual page Q2, one of the entries in GART 420 corresponding to page Q2 will be accessed, and that entry will comprise and/or identify the base address of corresponding 4 KB real page 451, 452, 453, or 454. Which GART entry 441–444 is accessed is determined by the memory controller in the memory access operation.

For example, if the memory access operation specifies "ADDRESS M101", GART entry 441 identifies and/or points to the base address (44000 in this example) of real page P101. If the memory access operation specifies "ADDRESS M102", GART entry 442 points to the starting address (56000) of real page P102, and so on.

The operation of the software for filling the GART 420 will now be described.

Figure 5:
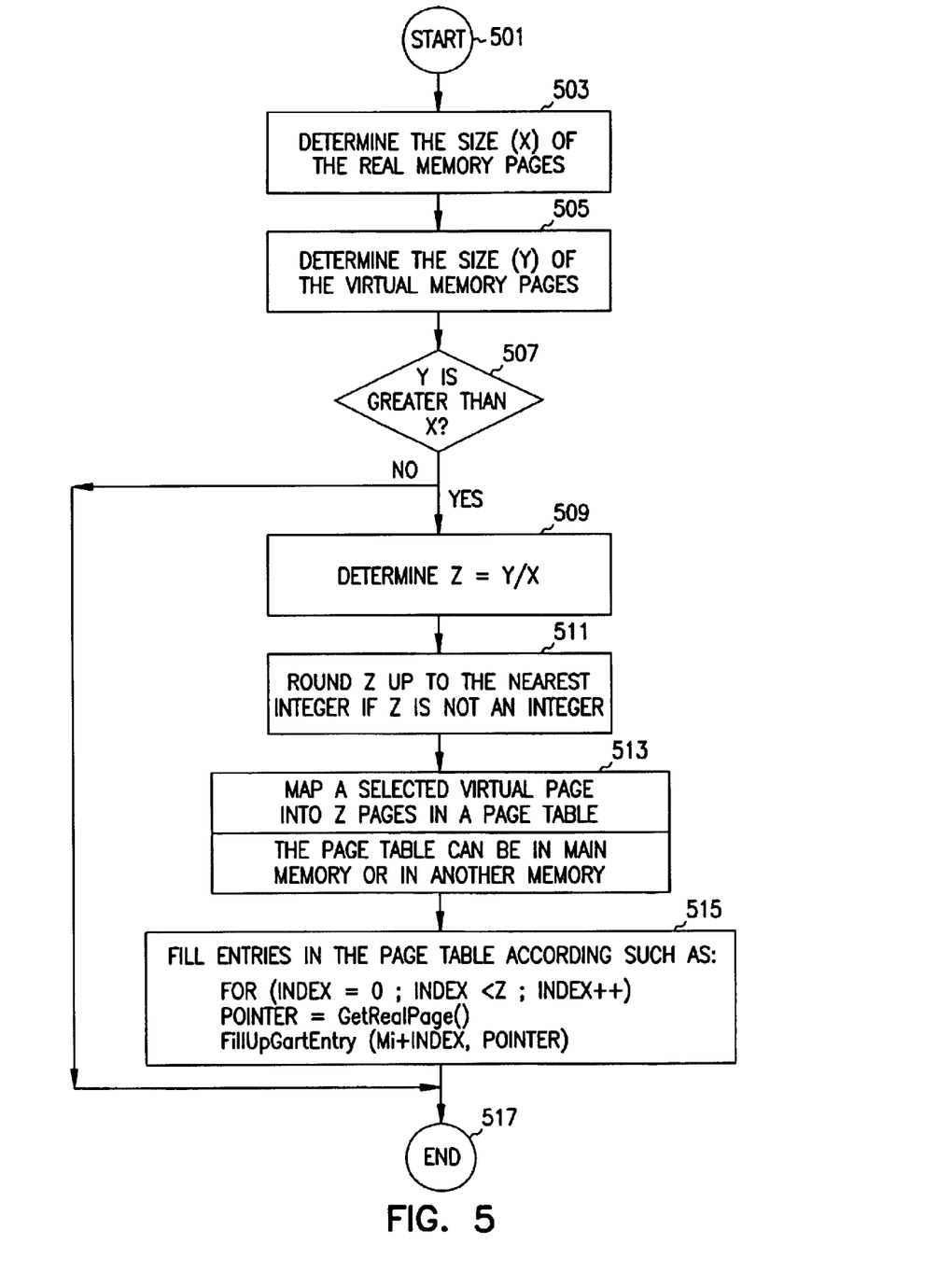
FIG. 5 illustrates a flow diagram of a method for making entries in a graphics address remapping table (GART) that supports both contiguous and non-contiguous real pages, in accordance with an embodiment of the subject matter.

FIG. 5 illustrates a flow diagram of a method for making entries in a graphics address remapping table (e.g. GART 420, FIG. 4) that supports both contiguous and non-contiguous real pages, in accordance with an embodiment of the subject matter. The method starts in 501.

In 503, the size (X) of first-sized pages (e.g. real memory pages supported by the chipset core logic 410 of FIG. 4) is determined. This can be implemented by a suitable instruction in the GART driver 438 (FIG. 4), such as "Get Chipset Page Size".

Still referring to FIG. 5, in 505 the size (Y) of second-sized pages (e.g. virtual memory pages of an operating system) is determined. This can be implemented by a suitable instruction in the GART driver, such as "Get Operating System Page Size". Both X and Y are assumed to be positive integers.

In 507, X and Y are compared, and if Y is less than or equal to X, the method ends at 517; otherwise, it proceeds to box 509, where the value (Z) of Y/X is determined.

In 511, the value of Z is rounded up to the next higher integer if Z is not an integer. Thus Z=5.25 is rounded to 6; Z=6.99 would be rounded to 7; and so forth.

In 513, a selected virtual page is mapped into Z pages in a page table (e.g. GART 420 in FIG. 4). In an embodiment, each virtual page may be mapped in this manner. The page table may be stored in main memory (e.g. main memory 430 in FIG. 4) or in another memory or storage area, including a dedicated memory. This operation is further implemented in 515, wherein entries are stored or filled in the page table by GART driver 438 (FIG. 4) using a suitable algorithm, such as the one appearing below.

Each page table entry may comprise a base address of a first-sized page (e.g. real page). A suitable pseudo-code algorithm to fill entries in GART 420 to support non-contiguous real pages is provided as follows:

```
(1)     // Each virtual page is mapped into Z
(2)     //real pages.
(3)     For (Index = 0; Index < Z; Index++)
(4)     {
(5)     //GetRealPage( ) is an OS call available
(6)     //for use by a GART driver in the OS.
(7)     Pointer = GetRealPage( )
(8)     //Allocate one available real page that
(9)     //may be located anywhere in memory.
(10)    //Store the result in the Pointer variable.
(11)    //The GART driver fills the Mi
(12)    //entry in the GART table with the
(13)    //starting address of the available real page.
(14)    //Note that for a given virtual page, several
(15)    //GART entries will be filled with the
(16)    //addresses of smaller real pages
(17)    //that can be anywhere (either contiguous
(18)    //or non-contiguous) in the memory.
(19)    FillUpGartEntry (Mi+Index, Pointer);
(20)    }
```

In the above code, every line prefaced by "//" represents a comment.

Lines (2–3), (5), and (12–13) together represent a loop that fills four entries in the GART for each virtual page, according to an embodiment wherein each virtual page is mapped to four real pages. Each entry contains the starting address of a real page in real memory. In an embodiment, the four GART entries for each virtual page are consecutive; in another embodiment, the four GART entries for each virtual page may not be consecutive.

In line (3) of the above code, a temporary variable called Index is successively incremented by 1 from an initial value of 0 to a final value of 3, assuming that Z=4 (i.e. that each virtual page is mapped to four real pages).

In line (7) a Pointer variable is set to the value of a memory function GetRealPage( ). GetRealPage( ) is a memory management function, available in the operating system, which gets the starting address or base address of the next real page in a maintained list of available real pages. In other words, this function determines the location of an available real page.

In line (19), assume that Mi identifies the ith entry in the GART, and assume that we want to fill four GART entries beginning with the Mi entry. The function FillUpGartEntry performs this operation.

For the first GART entry for a given virtual page Qi, the first argument is (Mi+Index), and the second argument (Pointer) is whatever real page starting address value the Pointer variable contains for this iteration of the loop.

For example, for the M101 GART entry, the first argument gives M101 +0, and the second argument (Pointer) gives the real page base address, e.g. 44000. Thus GART entry M101 in this example stores 44000, which identifies the location of real page P101.

For the (M+1)th GART entry, the first argument gives M+1, and the second argument gives whatever real page starting address value the Pointer variable contains for this iteration of the loop (e.g. address 56000). Thus GART entry M102 in this example is 56000.

For the (M+2)th GART entry, the first argument gives M+2, and the second argument gives whatever real page starting address value the Pointer variable contains for this iteration of the loop (e.g. address 48000). Thus GART entry M103 in this example is 48000.

Finally, for the (M+3)th GART entry, the first argument gives M+3, and the second argument gives whatever real page starting address value the Pointer variable contains for this iteration of the loop (e.g. address 38000). Thus GART entry M104 in this example is 38000.

Referring back to FIG. 4, the M101 GART entry 441 contains the starting address (44000) of a 4 KB page P101 (identified by reference number 451). The 4 KB page P101 is the first of the four real pages to which virtual page Q2 is mapped.

Similarly, the M102 GART entry 442 contains the starting address (56000) of page P102. Likewise, the M103 and M104 GART entries contain the base addresses (48000 and 38000) of pages P103 and P104, respectively.

It will be understood by those skilled in the art that the operations of the methods shown and described herein can be carried out in a different order than those described with reference to FIGS. 2, 3, and 5.

In summary, the present disclosure provides methods and apparatus to map pages of disparate sizes. The methods and apparatus conserve memory space and support very fast memory transfers, which are particularly useful in implementing high performance graphical and audio-visual applications in commercially competitive data processing systems.

In addition, the present disclosure provides methods and apparatus to fill a graphics address remapping table (GART) with the correct entries for mapping virtual pages to real pages, thereby conserving memory space. In some embodiments, the real pages may be non-contiguous within real memory.

Further, the present disclosure provides methods and apparatus for performing fast and efficient address translation between virtual pages and real pages. The real pages need not be contiguous within real memory.

It will be apparent to those skilled in the art that the disclosed subject matter can be modified in numerous ways and can assume many embodiments other than those embodiments specifically set out and described above. For example, instead of being stored in main memory the GART can be stored in a dedicated memory addressable by the AGP chipset. Alternatively, all or part (e.g. the most recently translated portion) of the GART could be stored in a cache memory that is associated with a processor or other instruction execution logic circuit.

The memory page sizes supported by the chipset and operating system could be different from the examples used above. In addition, the memory page sizes supported by the chipset, the operating system, and the GART could be variable. For example, the GART could be suitably programmed by one of ordinary skill to access either a 4 KB page or a 16 KB page.

The present subject matter may be embodied in other specific forms without departing from the spirit or essential characteristics thereof. The present embodiments are therefore to be considered in all respects as illustrative and not restrictive, the scope of embodiments of the subject matter being indicated by the appended claims rather than by the foregoing description, and all changes which come within the meaning and range of equivalency of the claims are therefore intended to be embraced therein.

It is emphasized that the Abstract is provided to comply with 37 C.F.R. §1.72(b) requiring an Abstract that will allow the reader to ascertain the nature and gist of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method performed by a data processing system comprising a processor and a memory coupled to the processor, the memory capable of storing real pages of size X, the memory storing an address translation driver comprising a plurality of address translation instructions, and the processor capable of executing selected ones of the address translation instructions and of executing instructions within an operating system organized in virtual pages of size Y, wherein X and Y are positive integers, and wherein Y is greater than X, the method comprising the following operations:

mapping a virtual page into a plurality of non-contiguous real pages;

wherein a virtual page is mapped into Z=Y/X non-contiguous real pages;

wherein Z is not an integer; and wherein Z is rounded up to the nearest integer.

2. The method recited in claim 1, wherein mapping uses a page table.

3. The method recited in claim 2, wherein mapping further comprises:
   storing entries in the page table, each page table entry identifying a corresponding real page in a memory.

4. The method recited in claim 3, wherein each entry identifies a base address of the corresponding real page.

5. The method recited in claim 1, wherein X and Y are determined by a driver executing first and second instructions, wherein X and Y are compared by the driver, and wherein Z is rounded up to the nearest integer by the driver only if Y is greater than X.

6. A method performed by a data processing system comprising a processor and a memory coupled to the processor, the memory capable of storing real pages of size X, the memory storing an address translation driver comprising a plurality of address translation instructions, and the processor capable of executing selected ones of the address translation instructions and of executing instructions within an operating system organized in virtual pages of size Y, wherein X and Y are positive integers, and wherein Y is greater than X, the method comprising the following operations:
   determining X by executing a first address translation operation including at least a first one of the plurality of address translation instructions;
   determining Y by executing a second address translation operation including at least a second one of the plurality of address translation instructions;
   determining Z=Y/X by executing a third address translation operation including at least a third one of the plurality of address translation instructions;
   determining that Z is not an integer by executing a fourth address translation operation including at least a fourth one of the plurality of address translation instructions;
   rounding Z up to the nearest integer by executing a fifth address translation operation including at least a fifth one of the plurality of address translation instructions; and
   mapping a selected virtual page into Z non-contiguous real pages in a page table by executing a sixth address translation operation including at least a sixth one of the plurality of address translation instructions.

7. The method recited in claim 6, wherein mapping further comprises:
   storing entries in the page table, each page table entry identifying a corresponding real page in the memory.

8. The method recited in claim 7, wherein each entry identifies a base address of the corresponding real page.

9. The method recited in claim 7, wherein mapping further comprises:
   determining a location of an available real page; and
   storing the location in a page table entry.

10. The method recited in claim 7 and further comprising:
    determining the locations of Z available real pages; and
    storing the locations in Z consecutive entries of the page table.

11. The method recited in claim 6, wherein the first two determining operations are performed in a different order.

12. A data processing system comprising a processor, a local memory, and a main memory coupled to the processor and to the local memory, the main memory capable of storing real pages of size X, the local memory to store an address translation driver comprising a plurality of address translation instructions, and the processor capable of executing selected ones of the address translation instructions and of executing instructions within an operating system organized in virtual pages of size Y, wherein X and Y are positive integers, and wherein Y is greater than X, the address translation instructions comprising the following operations:
   determining the size X of the real pages by executing a first address translation operation including at least a first one of the plurality of address translation instructions;
   determining the size Y of the virtual pages by executing a second address translation operation including at least a second one of the plurality of address translation instructions;
   determining Z=Y/X by executing a third address translation operation including at least a third one of the plurality of address translation instructions;
   determining that Z is not an integer by executing a fourth address translation operation including at least a fourth one of the plurality of address translation instructions;
   rounding Z up to the nearest integer by executing a fifth address translation operation including at least a fifth one of the plurality of address translation instructions; and
   mapping a selected virtual page into Z non-contiguous real pages in a page table by executing a sixth address translation operation including at least a sixth one of the plurality of address translation instructions.

13. The system recited in claim 12, wherein mapping further comprises:
    storing entries in the page table, each page table entry identifying a corresponding real page in the main memory.

14. The system recited in claim 13, wherein each entry identifies a base address of the corresponding real page.

15. The system recited in claim 13, wherein mapping further comprises:
    determining a location of an available real page; and
    storing the location in a page table entry.

16. A computer-readable medium having computer-executable instructions that, when executed, result in operations being performed in a data processing system, the data processing system comprising a processor and a memory coupled to the processor, the memory capable of storing real pages of size X, the memory storing an address translation driver comprising a plurality of address translation instructions, and the processor capable of executing selected ones of the address translation instructions and of executing instructions within an operating system organized in virtual pages of size Y, wherein X and Y are positive integers, and wherein Y is greater than X, the operations comprising:
    determining the size X of the real pages by executing a first address translation operation including at least a first one of the plurality of address translation instructions;
    determining the size Y of the virtual pages by executing a second address translation operation including at least a second one of the plurality of address translation instructions;
    determining Z=Y/X by executing a third address translation operation including at least a third one of the plurality of address translation instructions;
    determining that Z is not an integer by executing a fourth address translation operation including at least a fourth one of the plurality of address translation instructions;

rounding Z up to the nearest integer by executing a fifth address translation operation including at least a fifth one of the plurality of address translation instructions; and mapping a selected virtual page into Z non-contiguous real pages in a page table by executing a sixth address translation operation including at least a sixth one of the plurality of address translation instructions.

17. The computer-readable medium recited in claim 16, wherein mapping further comprises:

storing entries in the page table, each entry identifying a corresponding real page in the memory.

18. The computer-readable medium recited in claim 17, wherein each entry identifies a base address of the corresponding real page.

19. The computer-readable medium recited in claim 17, wherein mapping further comprises:

determining a location of an available real page; and
storing the location in a page table entry.

* * * * *